United States Patent
Byun

(10) Patent No.: US 7,782,499 B2
(45) Date of Patent: Aug. 24, 2010

(54) IMAGE SCANNING APPARATUS WITH PREVIEW FUNCTION AND METHOD THEREFOR

(75) Inventor: Hyung-sik Byun, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1155 days.

(21) Appl. No.: 11/411,109

(22) Filed: Apr. 26, 2006

(65) Prior Publication Data

US 2006/0245018 A1 Nov. 2, 2006

(30) Foreign Application Priority Data

Apr. 27, 2005 (KR) .................. 10-2005-0034917

(51) Int. Cl.
*H04N 1/04* (2006.01)
(52) U.S. Cl. .................. 358/474; 358/505; 358/408; 358/498; 358/496; 382/298; 348/139; 399/372; 399/396
(58) Field of Classification Search ............... 358/1.13, 358/474, 527, 1.15, 400, 404, 498, 505, 408, 358/448, 453, 486, 496, 528, 449; 345/776, 345/77, 840; 382/298; 348/139, 24; 399/372, 399/396, 370
See application file for complete search history.

(56) References Cited

U.S. PATENT DOCUMENTS

| | | | |
|---|---|---|---|
| 5,189,516 A | | 2/1993 | Angell et al. |
| 6,028,942 A | * | 2/2000 | Greenberger ................. 381/67 |
| 6,128,013 A | * | 10/2000 | Prabhu et al. ................ 715/707 |
| 6,587,129 B1 | * | 7/2003 | Lavendel et al. ............. 715/776 |
| 7,064,858 B2 | * | 6/2006 | Iwai et al. ..................... 358/1.2 |
| 7,344,081 B2 | * | 3/2008 | Tseng .................... 235/462.13 |
| 2001/0043367 A1 | * | 11/2001 | Ogino ......................... 358/449 |
| 2003/0043399 A1 | * | 3/2003 | Johnston et al. ............ 358/1.13 |
| 2003/0048487 A1 | * | 3/2003 | Johnston et al. ............. 358/474 |
| 2003/0053160 A1 | * | 3/2003 | Cheng ......................... 358/527 |
| 2003/0179422 A1 | * | 9/2003 | Liu .............................. 358/527 |
| 2003/0210803 A1 | * | 11/2003 | Kaneda et al. .............. 382/100 |
| 2005/0088711 A1 | * | 4/2005 | Daniel ......................... 358/527 |
| 2005/0231767 A1 | * | 10/2005 | Brake et al. ................. 358/474 |
| 2006/0001923 A1 | * | 1/2006 | Kakutani .................... 358/509 |
| 2006/0114484 A1 | * | 6/2006 | Kitora ........................ 358/1.13 |

FOREIGN PATENT DOCUMENTS

| | | |
|---|---|---|
| CN | 1523872 A | 8/2004 |
| JP | 2001-339556 | 12/2001 |
| JP | 2002-305649 | 10/2002 |

OTHER PUBLICATIONS

Office Action issued in Chinese Patent Application No. 200610082073.5 on Jul. 6, 2007.

* cited by examiner

*Primary Examiner*—Negussie Worku
(74) *Attorney, Agent, or Firm*—Staas & Halsey LLP

(57) ABSTRACT

An image scanning apparatus with a preview function includes a scanning unit that scans a plurality of documents to obtain scanned images of the plurality of documents; a display unit; and a control unit that controls the display unit to display the scanned images of the plurality of documents as preview images of the plurality of documents.

20 Claims, 4 Drawing Sheets

IMAGE SCANNING APPARATUS WITH PREVIEW FUNCTION AND METHOD THEREFOR

CROSS-REFERENCE TO RELATED APPLICATION

This application claims the benefit of Korean Patent Application No. 2005-34917 filed on Apr. 27, 2005, in the Korean Intellectual Property Office, the disclosure of which is incorporated herein by reference in its entirety.

BACKGROUND OF THE INVENTION

1. Field of the Invention

An aspect of the invention relates to an image scanning apparatus having a preview function and a method therefor, and more particularly to an image scanning apparatus and a method therefor, the apparatus having a function for simultaneously displaying preview images of a plurality of documents to be scanned on a screen of an office machine such as a multifunction apparatus including an automatic document feeder (ADF).

2. Description of the Related Art

FIG. 1 shows an example of performing a scanning operation using a preview function in a conventional office machine having an automatic document feeder (ADF).

Referring to FIG. 1, a user sets a document to be scanned on the ADF (operation 100) and operates a scan driving program through a host (operation 105). The user operates a scan previewing process of the scan driving program to designate a region to be scanned in the document on the ADF (operation 110). The scan driving program transmits a scan command to the office machine (operation 115). The office machine performs a scanning operation to obtain a scanned image of the document on the ADF (operation 120), and transmits the scanned image to the scan driving program (operation 125). Some office machines will then discharge the document on the ADF. When transmission of the scanned image is completed, the scan driving program displays the scanned image on a preview screen as a preview image (operation 130). The user sets the document again on the ADF to scan the document while viewing the preview image (operation 135). The user designates a region to be scanned in the preview image using the scan driving program (operation 140), and then performs a scanning operation with respect to the designated region using the scan driving program (operation 145). A scanned image of the region designated by the user can be obtained through the above process, and the above process is repeated as many times as a number of documents to be scanned.

In a conventional office machine, the document is discharged when the scanning operation is completed. Therefore, designating of a region to be scanned can be performed only for one document at a time through the preview function, and cannot be performed while previewing a plurality of documents. Thus, the process of scanning-previewing-designating must be repeated for each document to be scanned.

SUMMARY OF THE INVENTION

An aspect of the invention is an apparatus for and a method of scanning an image by which preview images of a plurality of documents can be displayed on one screen of an office machine including an automatic document feeder (ADF).

According to an aspect of the invention, an image scanning apparatus with a preview function includes a scanning unit that scans a plurality of documents to obtain scanned images of the plurality of documents; a display unit; and a control unit that controls the display unit to display the scanned images of the plurality of documents as preview images of the plurality of documents.

According to another aspect of the invention, an image scanning system with a preview function includes an image scanning apparatus including a scanning unit that scans a plurality of documents to obtain scanned images of the plurality of documents, and a control unit that outputs a control signal to control previewing of the scanned images of the plurality of documents; and a host that enables previewing of the scanned images of the plurality of documents according to the control signal output by the control unit.

According to another aspect of the invention, an image scanning method using a preview function includes scanning a plurality of documents to obtain scanned images of the plurality of documents; and displaying the scanned images of the plurality of documents as preview images of the plurality of documents.

According to an aspect of the invention, an image scanning method includes scanning all of a plurality of documents to obtain scanned images of the plurality of documents; displaying the scanned images of all of the plurality of documents as preview images of the plurality of documents; designating respective scanning regions for all of the plurality of documents by designating the respective scanning regions in the preview images of the plurality of documents; and scanning the scanning regions of all of the plurality of documents to obtain scanned images of the scanning regions of the documents.

According to an aspect of the invention, there is provided a computer-readable medium encoded with processing instructions for implementing an image scanning method, performed by a computer, the method including scanning all of a plurality of documents to obtain scanned images of the plurality of documents; displaying the scanned images of all of the plurality of documents as preview images of the plurality of documents; designating respective scanning regions for all of the plurality of documents by designating the respective scanning regions in the preview images of the plurality of documents; and scanning the scanning regions of all of the plurality of documents to obtain scanned images of the scanning regions of the documents.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
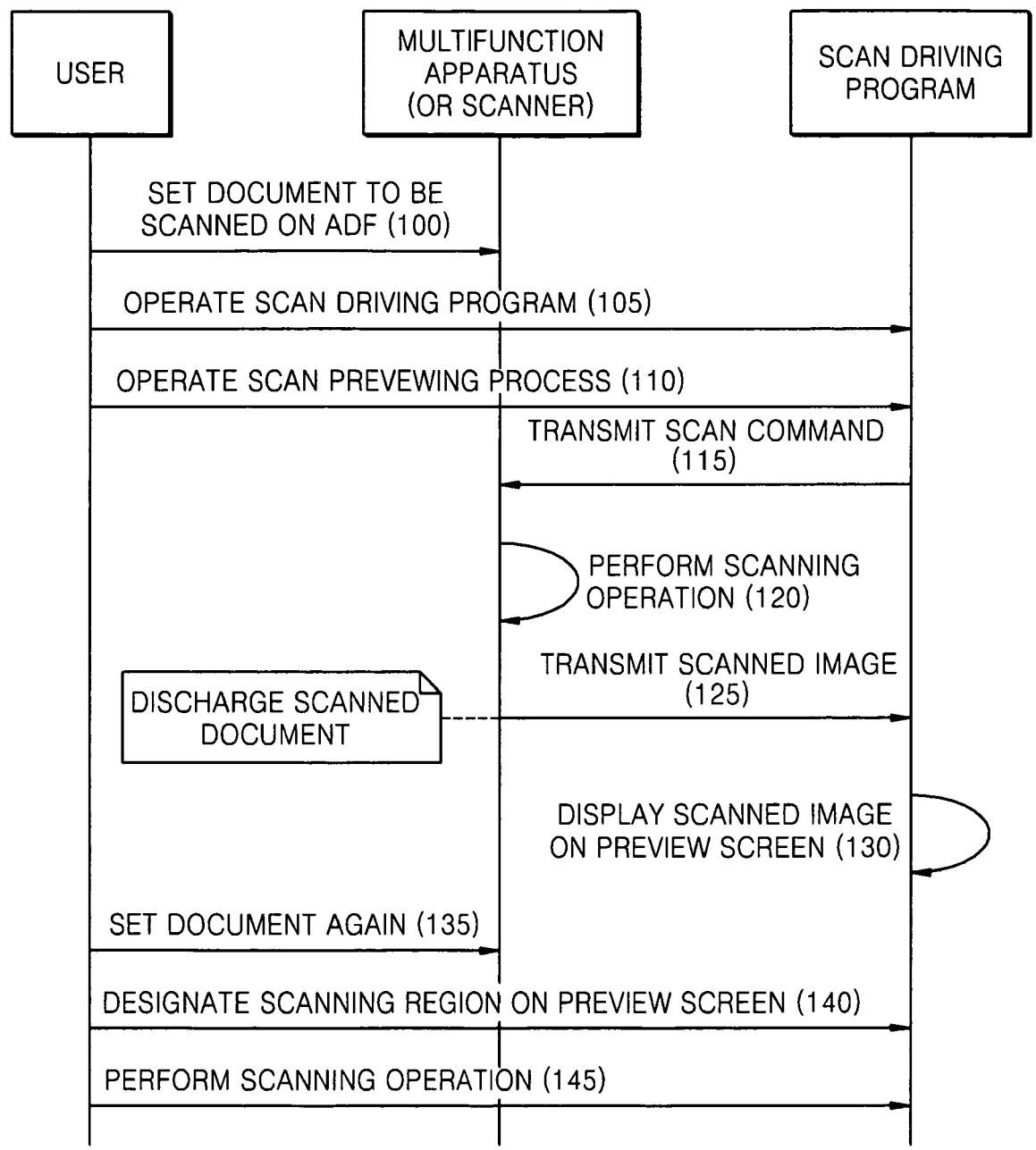
FIG. 1 shows a method of scanning a document using a preview function in a conventional office machine including an auto document feeder (ADF)

Reference will now be made in detail to embodiments of the invention, examples of which are shown in the accompanying drawings, wherein like reference numerals refer to like elements throughout. The embodiments are described below to explain the invention by referring to the figures.

Figure 2:
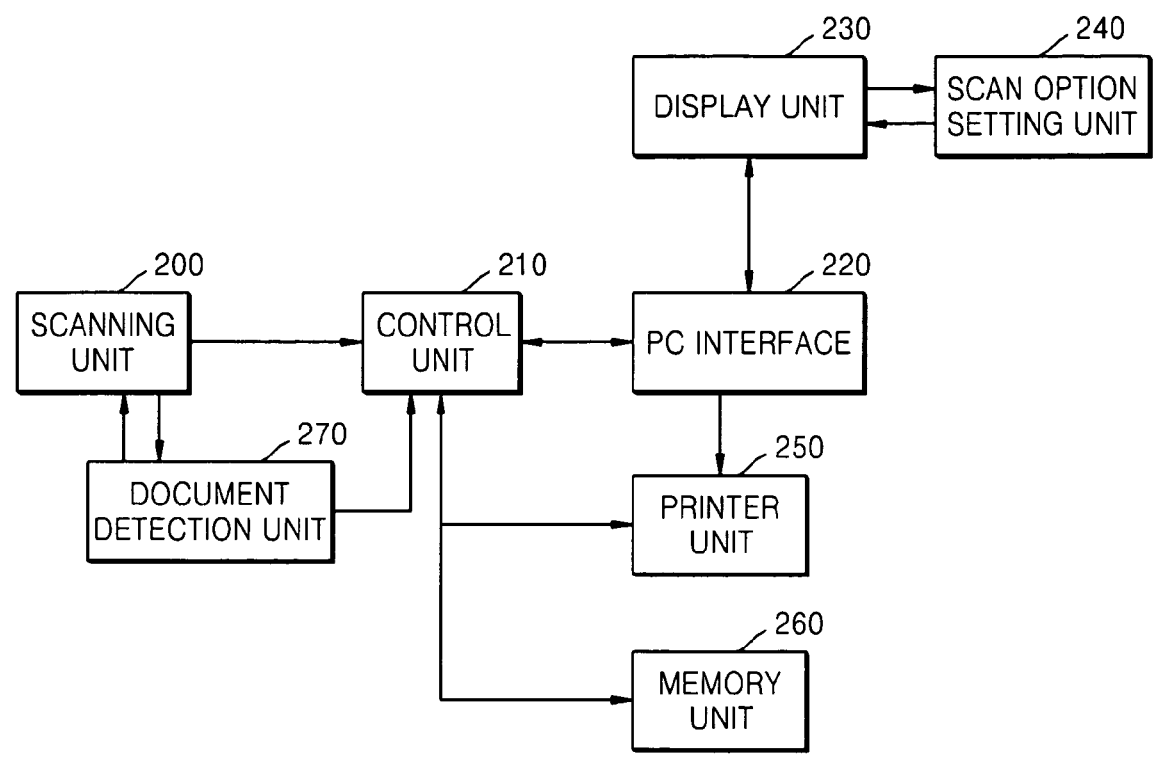
FIG. 2 is a block diagram of an image scanning apparatus having a preview function according to an aspect of the invention.

FIG. 2 is a block diagram of an image scanning apparatus having a preview function according to an aspect of the invention. The apparatus includes a scanning unit 200, a control unit 210, a PC interface 220, and a display unit 230.

The scanning unit 200 scans a plurality of documents placed on an automatic document feeder (ADF, not shown) to obtain image data of the documents. The image scanning apparatus may further include a memory unit 260 and a document detection unit 270.

The memory unit 260 stores an operating program of the control unit 210 and general control programs, and stores data generated when the control unit 210 runs the programs. Here, the memory unit 260 stores the image data generated by scanning the documents as preview images, that is, the memory unit 260 stores the image data of the documents.

The document detection unit 270 detects whether a document to be scanned is on the ADF. If a document to be scanned is not on the ADF, the document detection unit 270 provides an enable signal to the control unit 210 to cause the preview images stored in the memory unit 260 to be displayed by the display unit 230 as described below. If a document to be scanned is on the ADF, the processes of scanning the document with the scanning unit 200 and storing the image data in the memory unit 260 through the control unit 210 are repeated until the all documents on the ADF have been scanned.

The control unit 210 retrieves the preview images generated by the scanning unit 200 from the memory unit 260, and outputs the preview images to the PC interface 220 for display by the display unit 230.

The PC interface 220 transmits the preview images received from the control unit 210 to the display unit 230 so that the display unit 230 can display the preview images according to a control command of the control unit 210 supplied to the display unit 230 through the PC interface 220.

The display unit 230 displays the preview images received from the PC interface 220 on one screen in response to the control command of the control unit 210. It is desirable that the preview images are displayed on one screen as thumbnail images. Various sizes or resolutions of the preview images can be set depending on the number of preview images to be displayed on the screen.

Referring to FIG. 2, it is desirable that the image scanning apparatus further includes a scan option setting unit 240. The scan option setting unit 240 enables a user to set scanning options for the displayed preview images. Examples of scanning options that can be set by the user are scanning region designation, resolution, brightness, and contrast. The scan option setting unit 240 may be accessed via a user interface displayed on the display unit 230.

When a certain scanning region of the preview image is designated by the scan option setting unit 240, scanning can be performed for the scanning region that the user wants to scan, and the resolution, brightness, and the contrast of the scanning region can be controlled. Therefore, the user can set the scanning options while viewing the preview images according to the user's taste.

Referring to FIG. 2, it is desirable that the apparatus further includes a printer unit 250. The printer unit 250 prints the data stored in the memory unit 260 or data supplied from the PC interface 220 according to a command of a host computer (not shown).

Figure 3:
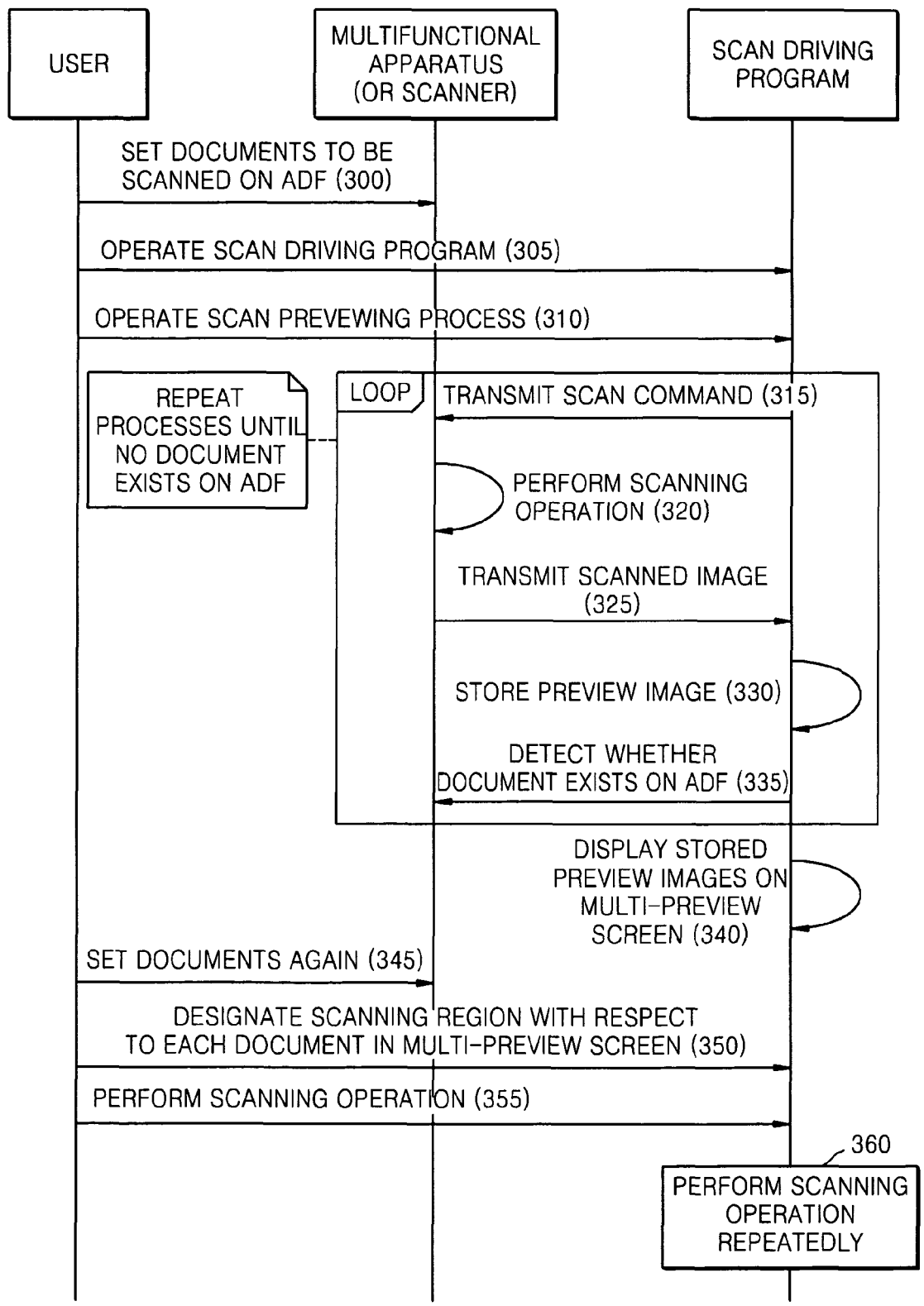
FIG. 3 is a flow chart of a method of scanning an image using a preview function according to an aspect of the invention.

FIG. 3 is a flow chart of a method of scanning an image using the preview function according to an aspect of the invention. The method will be described with reference to FIGS. 2 and 3.

Referring to FIGS. 2 and 3, the user sets documents to be scanned on the ADF (operation 300), and operates a scan driving program using the host computer (operation 305). The user operates a scan previewing operation of the scan driving program to designate a region to be scanned in the document on the ADF (operation 310). The scan driving program transmits a scan command to the office machine (operation 315). When the scanning unit 200 receives the scan command, it performs a scanning operation to obtain a scanned image of the document on the ADF (operation 320). The office machine transmits the scanned image to the scan driving program (operation 325). When the transmission of the scanned image is completed, the memory unit 260 stores the scanned image as a preview image (operation 330). When the preview image has been stored, the document detection unit 270 detects whether any document to be scanned is on the ADF (operation 335). If a document to be scanned is on the ADF, operations 315 through 335 are repeated until all documents on the ADF have been scanned.

If a document to be scanned is not on the ADF, the control unit 210 displays the preview images stored in the memory unit 260 on a multi-preview screen using the display unit 230 (operation 340). The preview images may be displayed on the multi-preview screen as thumbnail images.

When the preview images of all of the scanned documents have been stored and displayed, the user sets the documents on the ADF to scan the documents again while viewing the multi-preview screen (operation 345). The user designates a scanning region to be scanned in each document on the multi-preview screen using the scan option setting unit 240 (operation 350). Scanning options may be set with respect to the entire multi-view screen or the designed scanning regions using the scan option setting unit 240. Examples of such scanning options are image type, resolution, and reproduction ratio.

The user performs the scanning operation with respect to the designated region for the first document on the ADF using the scan driving program (operation 355). The scan driving program then performs the scanning operation repeatedly with respect to the designated scanning regions of the rest of the documents on the ADF (operation 360). Through the above processes, images of the designated scanning regions of all of the documents can be obtained.

Figure 4:
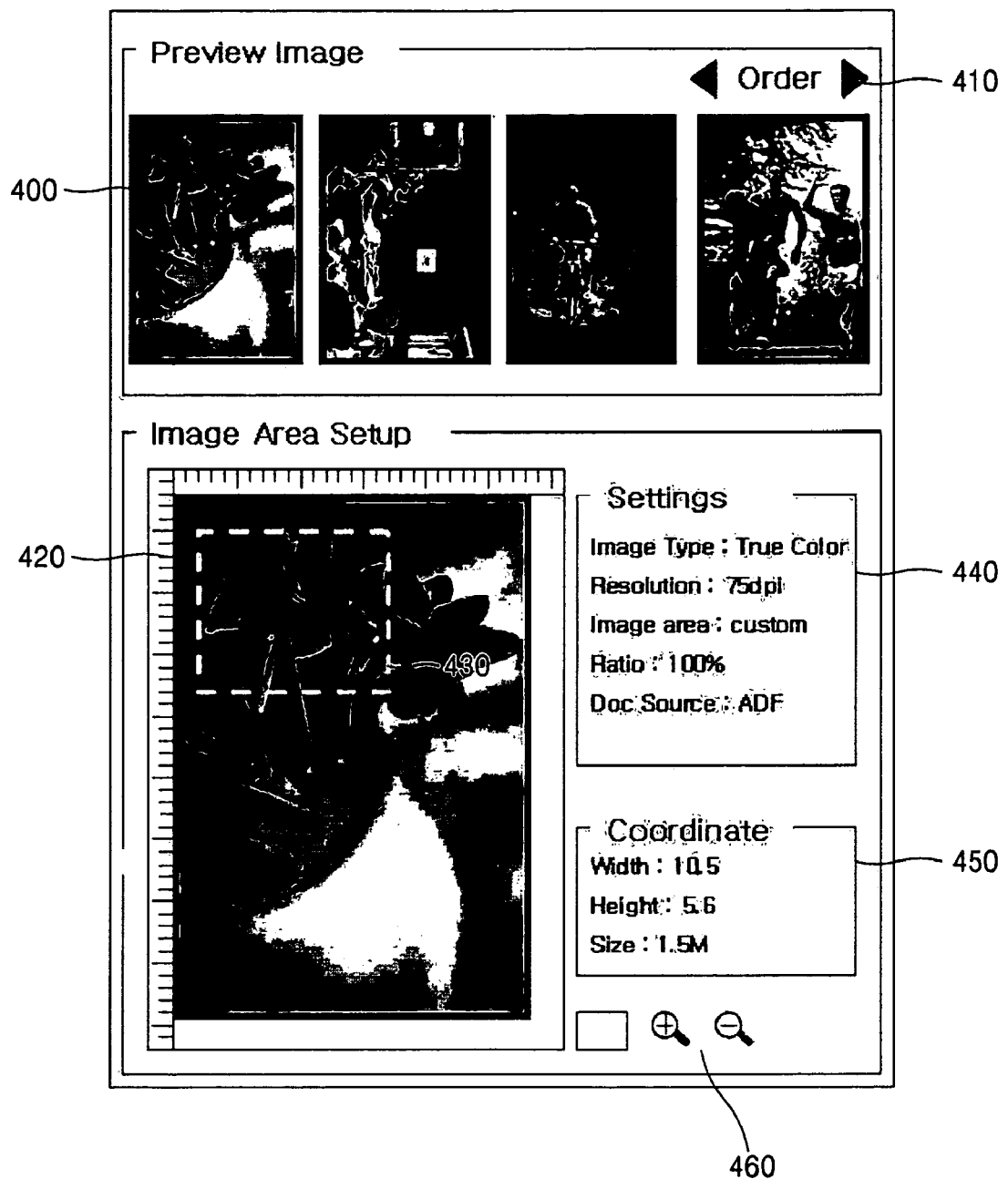
FIG. 4 is an example of a user interface for performing functions of a scan option setting unit disposed on a display unit of FIG. 2.

FIG. 4 is an example of a user interface for performing the functions of the scan option setting unit 240 displayed on the display unit 230 of FIG. 2.

Referring to FIG. 4, the preview images are displayed as thumbnail images in a preview region 400. Previous preview images and next preview images can be displayed sequentially using left/right buttons 410.

When one of the preview images is selected by the user, the selected preview image is displayed in an expanded region 420. A scanning region 430 is designated by the user in the preview image displayed in the expanded region 420, and scanning options can be individually set for the scanning region 430.

When the user designates the scanning region 430, settings such as width, height, and file size of the image in the scanning region 430 are displayed in the coordinate section 450, and a dialog box (not shown) of the coordinate section 450 can be used to change the settings of the image in the scanning region 430.

A first setting section 440 displays basic scanning environment settings of the preview image displayed in the expanded region 420, and the basic scanning environment settings can be changed using a dialog box (not shown) of the first setting section 440.

A second setting section 460 displays tools for enlarging or reducing the preview image displayed in the expanded region 420.

Aspects of the invention may also be embodied as computer-readable code in a computer-readable medium. Examples of a computer-readable medium include read-only memory (ROM), random-access memory (RAM), magnetic storage media (e.g., floppy discs, hard discs, etc.), optical storage media (e.g., CD-ROMs, DVDs, etc.) and carrier waves (e.g., transmissions over the Internet). The computer-readable medium may also be distributed over network-coupled computer systems so that the computer-readable code is stored and executed in a distributed fashion. Functional programs, code, and code segments for implementing aspects of the invention can be easily constructed by programmers skilled in the art to the which invention pertains.

According to an aspect of the invention, preview images of a plurality of documents can be displayed on one screen of an office machine having an ADF, and scanning regions can be designated for all of the preview images. Therefore, when scanning regions of the documents are designated using a preview function, there is no need to repeat the scanning and previewing processes for each of the documents as is required in the related art.

Although embodiments of the invention have been described in terms of an office machine such as a multifunction apparatus including an automatic document feeder, the invention is not limited to such a multifunction apparatus, but is applicable to any apparatus capable of scanning documents and displaying preview images of the documents. Furthermore, the term "office machine" is not limited to machines that are used only in offices, but includes machines for home use, mobile use, or any other use.

Although several embodiments of the invention have been shown and described, it would be appreciated by those skilled in the art that changes may be made in these embodiments without departing from the principles and spirit of the invention, the scope of which is defined in the claims and their equivalents.

What is claimed is:

1. An image scanning apparatus with a preview function, the apparatus comprising:
   a scanning unit that scans a plurality of documents to obtain scanned images of the plurality of documents;
   a display unit; and
   a control unit that controls the display unit to display the scanned images of the plurality of documents as preview images of the plurality of documents, and controls the scanning unit to scan respective scanning regions of all of the plurality of documents to obtain scanned images of the scanning regions of the documents using one scan command,
   wherein the scanning regions are respectively designated for the plurality of documents on the displayed preview images of the plurality of documents.

2. The apparatus of claim 1, further comprising a storing unit that stores the scanned images of the plurality of documents as image data.

3. The apparatus of claim 1, wherein the scanning unit comprises an automatic document feeder (ADF).

4. The apparatus of claim 3, wherein the scanning unit further comprises a document detection unit that detects whether any of the plurality of documents is still on the ADF.

5. The apparatus of claim 1, wherein the display unit displays one of the preview images at a time on one screen, or displays a plurality of the preview images at a time on one screen.

6. The apparatus of claim 1, wherein the display unit displays the preview images in a reduced size.

7. The apparatus of claim 1, further comprising a scan option setting unit that enables setting of scanning options for the preview images displayed by the display unit.

8. The apparatus of claim 7, wherein the scanning options comprise scanning region designation, resolution, brightness, and/or contrast.

9. An image scanning system with a preview function, the system comprising:
   an image scanning apparatus comprising
      a scanning unit that scans a plurality of documents to obtain scanned images of the plurality of documents, and
      a control unit that outputs a control signal to control previewing of the scanned images of the plurality of documents, and controls the scanning unit to scan respective scanning regions of all of the plurality of documents to obtain scanned images of the scanning regions of the documents using one scan command; and
   a host that enables previewing of the scanned images of the plurality of documents according to the control signal output by the control unit, and enables the scanning regions to be respectively designated for the plurality of documents on the previewed scanning images of the plurality of documents.

10. The system of claim 9, wherein the scanning unit comprises an automatic document feeder (ADF).

11. An image scanning method with a preview function, the method comprising:
    scanning, by an image scanning apparatus, a plurality of documents to obtain scanned images of the plurality of documents;
    displaying the scanned images of the plurality of documents as preview images of the plurality of documents; and
    scanning, by the image scanning apparatus, respective scanning regions of all of the plurality of documents to obtain scanned images of the scanning regions of the documents using one scan command,
    wherein the scanning regions are respectively designated for the plurality of documents on the displayed preview images of the plurality of documents.

12. The method of claim 11, further comprising:
    storing the scanned images of the documents as image data.

13. The method of claim 11, wherein the scanning of the plurality of documents comprises scanning the plurality of documents using an automatic document feeder (ADF).

14. The method of claim 13, wherein the scanning of the plurality of documents further comprises detecting whether any of the plurality of documents is still on the ADF.

15. The method of claim 11, wherein the displaying of the scanned images comprises displaying one of the preview images at a time on one screen, or displaying a plurality of the preview images at one time on one screen.

16. The method of claim 11, wherein the displaying of the scanned images comprises displaying the preview images in a reduced size.

17. The method of claim 11, further comprising setting scanning options for the preview images displayed in the displaying of the scanned images.

18. The method of claim 17, wherein the scanning options comprise scanning region designation, resolution, brightness, and/or contrast.

19. An image scanning method comprising:
   scanning, by an image scanning apparatus, all of a plurality of documents to obtain scanned images of the plurality of documents;
   displaying the scanned images of all of the plurality of documents as preview images of the plurality of documents;
   designating respective scanning regions for all of the plurality of documents by designating the respective scanning regions in the preview images of the plurality of documents; and
   scanning, by the image scanning apparatus, the scanning regions of all of the plurality of documents to obtain scanned images of the scanning regions of the documents using one scan command.

20. A computer-readable medium encoded with processing instructions for implementing an image scanning method, performed by a computer, the method comprising:
   scanning all of a plurality of documents to obtain scanned images of the plurality of documents;
   displaying the scanned images of all of the plurality of documents as preview images of the plurality of documents;
   designating respective scanning regions for all of the plurality of documents by designating the respective scanning regions in the preview images of the plurality of documents; and
   scanning the scanning regions of all of the plurality of documents to obtain scanned images of the scanning regions of the documents using one scan command.

* * * * *